United States Patent [19]

Meyer et al.

[11] Patent Number: 4,609,699

[45] Date of Patent: Sep. 2, 1986

[54] POLYARYLENE SULPHIDES WITH REDUCED CORROSION

[75] Inventors: Rolf-Volker Meyer, Krefeld; Klaus Reinking, Wermelskirchen; Karsten-Josef Idel; Rolf Dhein, both of Krefeld, all of Fed. Rep. of Germany

[73] Assignee: Bayer Aktiengesellschaft, Leverkusen, Fed. Rep. of Germany

[21] Appl. No.: 663,500

[22] Filed: Oct. 22, 1984

[30] Foreign Application Priority Data

Nov. 2, 1983 [DE] Fed. Rep. of Germany ....... 3339581

[51] Int. Cl.$^4$ .......................... C08K 5/35; C08K 5/34; C08K 5/16; C08K 5/04
[52] U.S. Cl. ..................... 524/100; 524/89; 524/92; 524/94; 524/99; 524/104; 524/105; 524/106; 524/243; 524/246; 524/247; 524/249; 524/251; 524/252; 524/254; 524/255; 524/256; 524/257; 524/258; 524/609

[58] Field of Search ............... 524/609, 243, 246, 247, 524/249, 251, 252, 89, 92, 94, 99, 100, 104, 105, 106, 254, 255, 256, 257, 258

[56] References Cited

U.S. PATENT DOCUMENTS

| | | | |
|---|---|---|---|
| 3,408,342 | 10/1968 | Horvath et al. | 524/247 |
| 3,776,880 | 12/1973 | Blackwell | 524/89 |
| 4,064,084 | 12/1977 | Blackwell | 524/609 |
| 4,478,969 | 10/1984 | Reed et al. | 524/106 |

FOREIGN PATENT DOCUMENTS 0070010 1/1983 European Pat. Off. ............ 524/609

*Primary Examiner*—Lewis T. Jacobs
*Attorney, Agent, or Firm*—Connolly and Hutz

[57] ABSTRACT

This invention relates to polyarylene sulphides (PPS) produced in known manner from optionally substituted halogen benzenes and aromatic polyhalogen compounds, optionally in combination with other polymers, fillers and/or reinforcing fibres, which contain certain N-containing organic bases for reducing the elimination levels of acidic, corrosion-producing volatile constituents and for improving the flow properties thereof.

6 Claims, No Drawings

POLYARYLENE SULPHIDES WITH REDUCED CORROSION

This invention relates to polyarylene sulphides (PPS) produced in known manner from optionally substituted halogen benzenes and aromatic polyhalogen compounds, optionally in combination with other polymers, fillers and/or reinforcing fibres, which contains certain N-containing organic bases to reduce the elimination of acidic, corrosion-producing volatile constituents and to improve the flow properties thereof.

Polyarylene sulphides are known (cf. U.S. Pat. Nos. 2,538,941 and 2,513,188). They may be produced from the corresponding aromatic halogen compounds and alkali metal or alkaline earth metal sulphides.

U.S. Pat. No. 3,919,177 describes a process for the production of p-phenylene sulphide polymers in which a p-phenylene sulphide polymer of relatively high molecular weight is produced from p-dihalogen benzene, alkali metal sulphide, an organic amide and, in addition, an alkali metal carboxylate.

U.S. Pat. No. 4,116,947 describes a process for the production of branched arylene sulphide polymers in which an aromatic polyhalogen compound containing more than two halogen substituents per molecule is additionally used, so that polymers having a low melt index which are suitable for spinning into fibres are obtained.

According to U.S. Pat. No. 4,096,132, unbranched p-polyphenylene sulphides having a slightly increased melt viscosity are obtained by carrying out the reaction in the presence of alkali metal carboxylate, preferably lithium acetate, and alkali metal hydroxides.

In general, the p-polyphenylene sulphides are subjected to a hardening or curing step by a chain-extending and branching reaction (cf. for example U.S. Pat. Nos. 3,717,620, 3,524,835 and 3,839,301). Without this hardening step, the polyphenylene sulphides generally have a low melt viscosity which is not conductive to thermoplastic processing.

According to U.S. Pat. No. 3,919,177, the p-polyphenylene sulphide produced may be melt-spun into fibres without preliminary curing providing lithium carboxylates are used as catalyst. According to U.S. Pat. No. 4,116,947 and DE-OS No. 2,817,731, the presence of a certain quantity of residual water ensures that the polyphenylene sulphides may be spun into fibres and extruded and moulded without a hardening step.

Despite the high dimensional stability under heat and the refractory properties thereof, polyphenylene sulphides are often restricted in applications because, during both production and processing in extruders and injection moulding machines and also in practical applications involving the use of metals, there is a high incidence of corrosion which may either damage the processing machine and render them useless or in practical application, particularly in electronic components, may result in malfunctions of the components.

Detailed studies of the corrosive behaviour of mouldings of polyphenylene sulphide have been made (Quella, Kunststoffe 71, pages 386 et seq. (1981)). There has been no shortage of attempts to reduce the corrosive properties of polyarylene sulphides by the addition of various additives. Thus, U.S. Pat. No. 4,017,450 recommends alkali metal carbonates, silicates or sodium hydroxide as corrosion-reducing additives although, in some cases, they produce only moderate results (Table I) and, in addition, adversely affect the electrical properties of the polymer preparations (Tables III and IV).

U.S. Pat. No. 4,178,276 describes the use of oxalates of metals belonging to Groups IA, IIA and IIB of Mendeleev's Periodic Table of Elements (Hoffmann, Rudorff, Anorganische Chemie, Page 98, 1966, Vieweg Verlag). According to the Table of Examples, the effect which may be achieved is minimal and also appears dubious because the effect does not increase with increasing dosage of the oxalate, instead it actually decreases according to the copper mirror test.

U.S. Pat. No. 4,115,344 recommends inter alia, ureas, hydrazines and amino acids. However, these products decompose at the processing temperatures so that they lose effectiveness in the polyphenylene sulphide ($>300°$ C.) and, accordingly, are spread on the surface of polyphenylene sulphides from aqueous solution and by subsequently drying. In the case of filled polyphenylene sulphides in particular, this requires another process step in addition to incorporation of the filler.

EP No. 0 070 010 puts forward a number of different proposals for reducing sulphur-containing emissions. Thus, polymers containing aromatic amino groups, polyvinyl carbazoles, polyimides, polyamides and polymers containing keto groups, such as polyether ether ketones, and even polybutylene terephthalate are either incorporated as additives in the polyphenylene sulphide or the constituents used for producing the particular polymer are individually incorporated in the polyphenylene sulphide polymer molecules. In addition, phenolic resins and triazine derivatives, such as 2,4,6-triphenyl triazine, are proposed. As may be seen from the data quoted, the effects obtainable are moderate and by no means conclusive.

If 0.1% of polyvinyl carbazole or polybutylene terephthalate is supposed to halve corrosive emissions, additions of 0.5% and 1% distinctly increase the level of emission. In other words, the proposed additives decompose the polyphenylene sulphide to be protected to a considerable extent at temperatures as low as 200° C.

Accordingly, at the temperatures of more than 300° C. required for the processing of PPS, not only does corrosion occur in machines, the PPS-polymer and the additives also undergo undesirable degradation.

The incorporation of telechelic oligomers, even when proofing a stabilizing effect, results in the loss of technically important properties, particularly dimensional stability under heat.

What is required, however, is a distinct reduction in the acidic emissions without an effect upon the other favourable properties of the polyarylene sulphides.

It has now surprisingly been found that products based on polyarylene sulphide, which show a considerable reduction in the elimination of acidic gases, even over prolonged periods, and which in addition have better flow properties for the same level of mechanical properties, may be obtained by adding certain primary and/or secondary (poly)amines in small quantities to polyarylene sulphides produced in any way.

Accordingly, the present invention relates to polyarylene sulphides containing from 0.1 to 5%, by weight, preferably from 0.5 to 3%, by weight, of (ar)aliphatic primary and/or secondary (poly)amines which have a boiling point of at least 150°–450° C., preferably at least 250° C.

The polyamines suitable for use in accordance with the present invention correspond to the following general formula:

$$X\underset{n}{\underbrace{\left(\begin{array}{c}H\\|\\N-R\end{array}\right)}} \quad (I)$$

wherein
X represents an n-functional
  aliphatic $C_1$–$C_{30}$ hydrocarbon radical, in which at most every third chain member may be an O-atom or an NH group,
  cycloaliphatic $C_5$–$C_{30}$ hydrocarbon radical,
  araliphatic $C_7$–$C_{30}$ hydrocarbon radical, optionally substituted by hydrocarbon branches;
R represents H, $C_1$–$C_{30}$ alkyl, $C_7$–$C_{30}$ aralkyl or $C_5$–$C_{30}$ cycloalkyl; and
n represents an integer of from 1 to 6, preferably from 1 to 3;
or X and R may be members of common, optionally $C_1$–$C_3$ alkyl-substituted heterocyclic rings containing from 5 to 12, preferably from 5 to 7, ring members.

The following are examples of (poly)amines suitable for use in accordance with the present invention:

(a) Monoamines (α) Primary amines:
1-heptylamine, 1-octylamine, 2-octylamine, dodecylamine, stearylamine, cyclooctylamine, cyclododecylamine, 1-hydroxy-3-aminomethyl-3,5,5-trimethylcyclohexane, benzylamine, 1- and 2-phenylethylamine, homoveratryl amine; aminoalcohols and aminoethers, for example 3-amino-1-propanol, 4-amino-1- and -2-butanol, (ethylhexyl)-(3-aminopropyl)-ether.

(β) Secondary amines:
Heptamethylene imine, 2,2,6,6-tetramethyl piperidine, 4-hydroxy-2,2,6,6-tetramethyl piperidine, di-n-butylamine, di-n-pentylamine, di-n-hexylamine, dioctylamine, dicyclohexylamine and dibenzylamine.

(γ) Amidines of the imidazoline type and of the tetrahydro Pyrimidine type, for example the following imidazolines:

2-phenyl imidazoline, 2-phenyl-4-methylimidazoline, 2-(m-tolyl)-4-methylimidazoline, 2-(m-pyridyl)-imidazoline, 1,4-tetramethylene-bis-(4-methylimidazoline), 2-methylimidazoline, 2,4-dimethylimidazoline, 2-ethylimidazoline, 2-ethyl-4-methylimidazoline, 2-benzylimidazoline, 2-(o-tolyl)-imidazoline, 2-(p-tolyl)-imidazoline, tetramethylene-bis-(imidazoline), 1,1,3-trimethyl-1,4-tetramethylene-bis-imidazoline, 1,1,3-trimethyl-1,4-tetramethylene-bis-(4-methylimidazoline), 1,3,3-trimethyl-1,4-tetramethylene-bis-(4-methylimidazoline), 1,2-phenylene-bis-imidazoline and 1,3-phenylene-bis-(4-methyl imidazoline). Mixtures of the imidazoline derivatives may be used; 2-phenylimidazoline and 2-methylimidazoline are particularly preferred.

Preferred tetrahydropyrimidines are, for example, 2-methyl-tetrahydropyrimidine, 2,4-, 2,5- and 2,6-dimethyltetrahydropyrimidine, 2-ethyl-tetrahydropyrimidine, 2-ethyl-4-methyl-tetrahydropyrimidine, 2-benzyl-tetrahydropyrimidine, 2-phenyl-tetrahydropyrimidine, 2-phenyl-4-methyl- , -5-methyl- and -6-methyl-tetrahydropyrimidine, 2,4-diaza-3-phenyl-7,9,9- and -7,7,9-trimethylbicyclo-(4.3.0)-2-nonene, 2,3-diaza-3-methyl-7,9,9- and -7,7,9-trimethylbicyclo-(4.3.0)-2-nonene and mixtures of these tetrahydropyrimidines.

Tetrahydropyrimidines are preferably used.

(b) Diamines:

Hexamethylene diamine, 2,2,4-(2,4,4)-trimethyl-hexamethylene diamines, octamethylene diamines, decamethylene diamine, dodecamethylene diamine, 2-ethyl octamethylene diamine, 1,1-10,10-disubstituted 1,11-diaminoundecanes (for example according to EP-A-0 077 298), hydroxy derivatives, for example 2-(2-aminoethylamino)-ethanol, 1,2-, 1,3-, 1,4-diaminocyclohexane, hydrogenation products of toluylene/diamines, 1,3-, 1,4-bis-(methylamino)-cyclohexane, m- and p-xylylene diamine, 1,8-diamino-p-menthane, isophorone diamine, 1-amino-2-aminomethyl-3,3,4(3,5,5)-trimethyl cyclopentane, 1,5-diaminocyclooctane, bis-(methylamino)-cyclooctanes, bis-methylamino-tricyclodecanes (TCD-Diamines®, products of Hoechst AG); 1,4-butane diol-bis-(3-aminopropyl ether), polyether diamines produced from diols, ethylene oxide, propylene oxide, tetrahydrofuran and, optionally, long-chain $C_8$–$C_{18}$ epoxides, followed by amination and having molecular weights $M_n$ of up to 2000; diaminodicyclohexyl methanes containing up to 2 $C_1$–$C_4$ alkyl substituents per ring, preferably 4,4'-diaminodicyclohexyl methane, N-aminoethyl piperazine, 1,3-di-4-piperidyl propane and homopiperazine.

(c) Polyamines:

(α) Polyamines containing only primary amino groups:

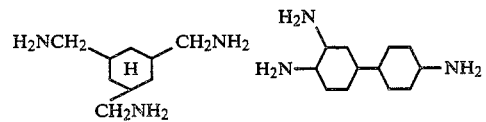

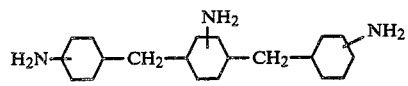

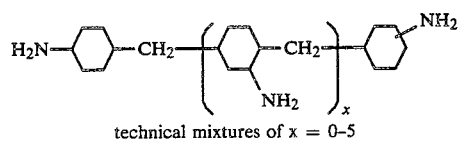

technical mixtures of x = 0–5

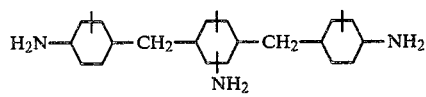

1,5,9-triaminocyclododecane, tris-methylaminocyclododecanes, hydrogenation products of product samples obtained by the addition of acrylonitrile to keto compounds (for example)

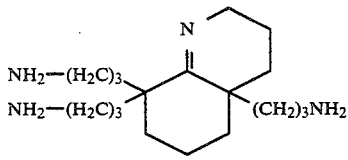

Polyether polyamines are, for example, those produced from trimethylol propane, glycerol, pentaerythritol and sorbitol, by reaction with ethylene oxide, propylene oxide, tetrahydrofuran, dec-1-ene oxide, dodec-1-ene oxide or mixtures thereof, followed by amination, and having molecular weights $M_n$ of from 400 to 5000. Polyethers of trimethylol propane and ethylene oxide/propylene oxide having molecular weights $M_n$ of from 500 to 1500 are preferably used.

(β) Other amines containing primary, secondary and, optionally, tertiary amino groups:

[H₂N—(CH₂)₆]₂—NH, polyamines of dicyclopentadiene and higher oligocyclopentadienes (EP No. 26 983), preferably

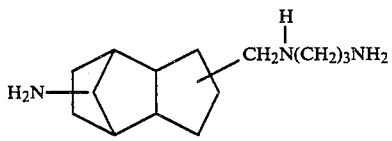

Of the (ar)aliphatic (poly)amines used in accordance with the present invention, it is preferred to use those having boiling points of at least 250° C., particular preference being attributed to (poly)amines containing cycloaliphatic portions, such as diaminodicyclohexyl methanes, hydrogenation products of relatively high molecular weight n-nuclear-n-amino compounds obtained by the condensation of aniline and formaldehyde, dicyclohexylamine, piperidine derivatives and bicyclic amidines of the tetrahydropyrimidine type corresponding to the following general formula:

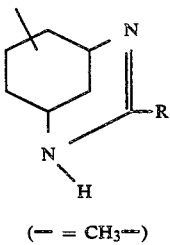

(— = CH₃—)

According to the present invention, these (poly)amines may be added to the polyarylene sulphides, preferably after the production, either individually or in admixture in amounts of from 0.1 to 5%, by weight, preferably from 0.5 to 3%, by weight. They are added with particular advantage during the compacting of polymers accumulating in fibrous forms or by compounding in suitable mixing machines, preferably in twin screw extruders via the melt phase, optionally in conjunction with other auxiliaries or additives, such as glass fibres or fillers.

According to the present invention, the amines may be incorporated in polyarylene sulphides which have been obtained in known manner from known starting materials, including sulphur donors, such as Na₂S and aromatic (poly)halogen compounds, for example aromatic dihalogen compounds, such as m-dichlorobenzene, p-dichlorobenzene p-dibromobenzene, m-dibromobenzene and 1-chloro-4-bromobenzene;

substituted aromatic dihalogen compounds, such as 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene;

aromatic tri- or tetra-halogen compounds, such as 1,2,3-trichlorobenzene, 1,2,4-trichlorobenzene, 1,2,4-tribromobenzene, 1,3,5-trichloro-1,4,6-trimethyl benzene, 1,2,3-trichloronaphthalene, 1,2,4-trichloronaphthalene, 1,2,6-trichloronaphthalene, 2,3,4-trichlorotoluene, 2,4,6-trichlorotoluene, 1,2,3,4-tetrachloronaphthalene, 1,2,4,5-tetrachlorobenzene, 2,2',4,4'-tetrachlorobiphenyl, 1,3,5-trichlorotriazine;

polynuclear halogenated compounds, such as bis-(4-chlorophenyl)-ether, bis-(4-chlorophenyl)-sulphide, bis-(4-bromophenyl)-sulphide, bis-(4-chlorophenyl)-sulphone, bis-(4-bromophenyl)-sulphone, bis-(4-chlorophenyl)-ketone, bis-(4-chlorophenyl)-methane, 2,2-bis-(p-chlorophenyl)-propane, 4,4'-dichlorobenzene biphenyl, 4,4'-dibromobiphenyl, 2,6-dichloropyridine and 2,5-dichlorothiophene.

The compounds mentioned may be used either individually or in admixture.

The polyarylene sulphides according to the present invention may be mixed with other polymers, with pigments and fillers, for example graphite, metal powder, glass powder, quartz powder or glass fibres, or may have the additives normally used for polyarylene sulphides, for example conventional stabilizers or mould release agents, added to them.

To determine the elimination levels of the acidic gases, predetermined quantities of polyarylene sulphides were melted in glass flasks and a constant quantity of air was passed through the thoroughly stirred melt at a predetermined temperature, as will be described in detail in the Examples.

The gases given off were collected in excess N/100 NaOH and the acid content quantitatively determined by back-titration. To observe the eliminated gas characteristic as a function of time, the NaOH solution was changed, for example, every 5 minutes or every 10 minutes.

While various polyarylene sulphides were found by this process to behave very differently, the use of the (poly)amines in accordance with the present invention, which on a laboratory scale were added to the granulate before melting and, on an industrial scale, during compounding, avoided or at least drastically reduced the elimination of acidic gases in all the polymer samples observed over a prolonged period.

Depending on the production process and, in particular, on the concentration of branching agent (presence of at least trifunctional aromatic halogen compounds during synthesis of the polymer) and upon the curing steps following production of the polymer, it is possible to obtain very different polyarylene sulphides.

Thus, unbranched or only slightly branched polyarylene sulphides are relatively low-viscosity materials which have a very low melt viscosity and which are only suitable for use as pourable sealing compounds, although the mechanical properties thereof in no way satisfy the requirements imposed on thermoplastic materials.

Although highly branched or subsequently branched (cured) polyarylene sulphides show very good mechanical properties, they are extremely difficult to process because of the very high viscosity of the melt even at temperatures above 300° C.

Accordingly, it was completely surprising to find that the (ar)aliphatic (poly)amines to be added to the polyarylene sulphides in accordance with the present invention greatly improve the flow properties of the polymers without significance effect upon the mechanical properties and hence upon the utility value thereof.

In some cases, the toughness is even improved.

The melt flow properties of the polyarylene sulphides may be determined in accordance with DIN 53 735 at 306° C. using a load of 2.16 kg and expressed in g/10 mins.

Accordingly, the melt viscosity $\eta_m$ of the polymer melt (mPa.s) was determined at 306° C. as a function of the shear force $\tau$ (in Pa) using an Instron rotational viscosimeter. It is possible in this way to determine melt viscosity over a very wide range of from $10^{-1}$ to $10^7$ Pa.s. In the Instron rheometer, the polymer is melted between a fixed plate and a rotatable cone and the torque of the cone is determined. The viscosity of the melt as a function of shear force may be calculated from the torque, angular velocity and equipment parameters. An Instron model 3250 rheometer was used; diameter of the cone and of the plate 2 cm.

The melt viscosity measured for a shear force $\tau$ of $10^2$ Pa is the value quoted.

The polyarylene sulphides according to the present invention may be directly processed by extrusion, extrusion blowing, injection moulding or other conventional techniques to form films, shaped articles or fibres. These products may be used in the conventional way, for example as automobile components, fittings, electrical components, such as switches, electronic boards, chemical-resistant parts and apparatus, such as pump housings and pump flywheels, etching baths, sealing rings, parts of office machines and communications equipment and also as domestic appliances, valves, ball-bearing components, etc.

EXAMPLES

Example 1A 20.0 g of a commercially available polyphenylene sulphide having a melt viscosity $\eta_m$ at 306° C. of 4500 Pa.s (RYTON P 4 ®=PPS 1) and 0.4 g of stearylamine (2%, based on polymer) were weighed into a 100 ml flask surmounted by a condensation attachment with 3 ground glass joints (stirrer, air input, gas outlet). Using a salt bath, PPS is heated to 320° C. with stirring. On reaching that temperature, 5 l/h of air are passed constantly through the stirred polymer melt and the gases given off are collected in a receiver filled with 100 ml of N/100 NaOH. The receiver is replaced every 5 minutes exactly and the quantity of acidic gases collected is titrated back against phenol phthalein using N/10 HCl.

The elimination levels of acidic gases measured after 20 minutes, 30 minutes and 60 minutes were used for characterizing the PPS-preparation and for comparison with other PPS-preparations. The 30-minute value is shown in Table 1.

Comparison Example 1a

The procedure is as in Example 1, except that no stearyl amine is added. The elimination levels of acidic gases, as shown in Table 1, are distinctly higher.

Comparison Examples 1b–e

Triethanolamine, diaminodiphenyl methane, bis(2-dimethylaminoethyl)-methylamine and N-cyclohexylaniline do not show reduction in the elimination levels of acidic gases under the test conditions of Example 1A.

Examples 1B to 1Q

As described in Example 1A, quantities of 2%, by weight, of the (poly)amines B–Q identified in Table 1 are added to the polyphenylene sulphide used in Example 1A and the thus-modified polymers are characterized as described in Example 1 (Table 1).

Examples 2A to 2Q

As in Example 1A, a commercially available polyphenylene sulphide having a melt viscosity $\eta_m$ of 5.8 Pa.s (at 306° C.), RYTON VI ®=PPS 2, is provided and treated with the (poly)amines A–Q identified in Table 1. The elimination levels of acidic gases determined after 30 minutes are shown in Table 1.

Examples 3A to 3Q

As in Example 1A, an unbranched polyphenylene sulphide having a melt viscosity $\eta_m$ of 0.1 Pa.s (PPS 3) is provided and treated with the (poly)amines A–Q identified in Table 1. The elimination levels of acidic gases determined after 30 minutes are shown in Table 1.

TABLE 1

| | Elimination levels of acidic gases from PPS 1–3 and (poly)amines, as determined after 30 minutes | | |
|---|---|---|---|
| Examples | 1<br>PPS 1 | 2<br>PPS 2 | 3<br>PPS 3 |
| Comparison test without polyamine | 3.6 | 5.0 | 7.4 |

TABLE 1-continued

Elimination levels of acidic gases from PPS 1-3 and (poly)amines, as determined after 30 minutes

| Examples | | 1 PPS 1 | 2 PPS 2 | 3 PPS 3 |
|---|---|---|---|---|
| A | $C_{18}H_{37}NH_2$ | — | 3.1 | 4.5 |
| B | $H_2N(CH_2)_{10}NH_2$ | — | 1.1 | 1.5 |
| C | Poly-BD-Telechel with $NH_2$—endgroups | — | — | 2.0 |
| D | [bis(aminomethylcyclohexyl)methane structure] | 0.6 | — | 1.5 |
| E | [aminocyclohexyl-CH2-cyclohexyl-NH-CH(CH3)-CH2OH structure] | — | 0.8 | 1.0 |
| F | [trimethyl-hydroxypiperidine structure] | 1.0 | — | 1.9 |
| G | [aminomethyl-hydroxy-trimethylcyclohexane structure] | — | 1.0 | 1.4 |
| H | [dicyclohexylamine structure] | 0 | — | 0.6 |
| I | [cyclohexyl-NH-(CH2)3NH2 structure] | — | 0.8 | 0.8 |
| K | [cyclohexyl-CH2NHCH2-phenyl structure] | 0.6 | 1.0 | 1.0 |
| L | [diamino polycyclic structure] | 0.8 | 0.7 | 1.5 |
| M | Tris-methylaminocyclododecane | — | 1.15 | 2.0 |
| N | [H2N(CH2)3-substituted bicyclic pyridine structure with (CH2)3NH2] | — | 0 | 1.0 |

TABLE 1-continued

Elimination levels of acidic gases from PPS 1-3 and (poly)amines, as determined after 30 minutes

| Examples | 1 PPS 1 | 2 PPS 2 | 3 PPS 3 |
|---|---|---|---|
| P (cyclohexyl diamine with C=N–H group) | 1.0 | 1.4 | 2.3 |
| Q ($H_2N$-cyclohexyl-$CH_2$-cyclohexyl($NH_2$)-$CH_2$-cyclohexyl-$NH_2$) | 0.5 | 0.8 | 2.0 |

— = not tested

Example 4

After drying for 3 hours at 130° C., 5.0 kg of the PPS-granulate used in Example 1 and, at the same time, 50 g of diamine E (1%, by weight, based on polymer) heated to 100° C. are uniformly introduced into a tight ZSK 32 twin-screw extruder and co-extruded at 320° C.

The power consumption of the extruder is reduced by 40% compared with extrusion of the polymer alone. The amine-modified polyphenylene sulphide is spun off in strand form into a water bath and granulated. The thoroughly dried granulate is injection-moulded to form standard small test bars which, by comparison with the unmodified polymer, are found to have substantially the same toughness values (as determined in accordance with DIN 53 453: $a_n \approx 5$ kJ/m$^2$, $a_K \approx 1$ kJ/m$^2$) and greater ball indentation hardness $H_{30}$ (as determined) in accordance with DIN 53 456; 185 N/mm against 163 N/mm).

The melt flow index (MFI) as measured on the granulate (in accordance with DIN 53 735: 306° C., 2.16 kg load) has increased from 2.5 g/10 mins. to 25 g/10 mins., so that a considerable improvement in processability is obtained without effect upon the other favourable properties. The elimination level of acidic gases, measured as described in Example 1A, amounted to 1.1 after 30 minutes (unmodified polymer: 3.6).

Comparison Example 4

The procedure is as in Example 4, except that 1%, by weight, of urea is used as additive. A strand of foamed polymer is obtained after extrusion. The elimination level of acidic gases, measured as described in Example 1A, amounts to 3.7.

Example 5

4.40 kg of a branched polyphenylene sulphide having a melt viscosity $\eta_m$ of 110 Pa.s, produced in accordance with EP No. 0,065,689, are compounded with 2.6 kg of a 1:1-mixture of talcum and kaolin and 3.0 kg of commercially available glass fibers (Silenca 8041 ®) and 100 g of diamine E in a type ZSK 32 twin-screw extruder (melt temperature 320° C.), after which the filled and reinforced thermoplast is spun off in strand form into a water bath and chopped into granulate.

After thorough drying to a water content of 0.2%, the melt viscosity of the compound was measured and test specimens were produced by injection moulding to determine impact strength, ball indentation hardness and dimensional stability under heat. The measured values are shown in Table 2.

Comparison Example 5

The procedure was as in Example 5, except that diamine E was not added. The properties determined are shown in Table 2.

Example 6

A compound is produced in the same way as in Example 6, except that it contains 44 parts, by weight, of a branched PPS produced in accordance with EP No. 0,065,689 (melt viscosity $\eta_m = 890$ Pa.s) and 1 part, by weight, of triamine Q. The product data determined as described in Example 5 are shown in Table 2.

Comparison Example 6

The procedure is as in Example 6, except that no triamine is added. The product data determined are shown in Table 2.

TABLE 2

Property comparisons of mineral-reinforced PPS-products with and without (poly)amine

| | | Example 5 | Comparison Example 5 | Example 6 | Comparison Example 6 |
|---|---|---|---|---|---|
| $\eta_m$ of the basic PPS | | 110 Pa.s | 110 Pa.s | 890 Pa.s | 890 Pa.s |
| Mineral-reinforced products: | | | | | |
| Viscosity as a function | 10 sec$^{-1}$ | 130 | 750 | 1,300 | 7,500 |
| of the shear gradient | 100 sec$^{-1}$ | 100 | 380 | 1,000 | 1,150 |
| at 310° C. | 1,000 sec$^{-1}$ | 80 | 160 | 300 | 450 |
| Impact strength (kJ/m$^2$) | | 10 | 7 | 8 | 6 |
| Ball indentation hardness | | 330 | 336 | 311 | 304 |

TABLE 2-continued

Property comparisons of mineral-reinforced PPS-products with and without (poly)amine

| $\eta_m$ of the basic PPS | Example 5<br>110 Pa.s | Comparison<br>Example 5<br>110 Pa.s | Example 6<br>890 Pa.s | Comparison<br>Example 6<br>890 Pa.s |
|---|---|---|---|---|
| Vicat VST/A (°C.) | 250 | 250 | 250 | 250 |

We claim:

1. Thermoplastically-processible moulding compositions of polyarylene sulphides containing from 0.1 to 5 parts, by weight, based on the content of polyarylene sulphide, of primary or secondary amines having at least two amino groups, a boiling point of at least 150° C., and having the formula:

wherein
X represents an n-function
aliphatic $C_1$–$C_{30}$ hydrocarbon radical, in which at most every third chain member is an O-atom or an NH-group,
cycloaliphatic, $C_5$–$C_{30}$ hydrocarbon radical,
araliphatic $C_7$14 $C_{30}$ hydrocarbon radical,
R represents H, $C_1$–$C_{30}$ alkyl, $C_7$–$C_{30}$ aralkyl or $C_5$–$C_{30}$ cycloalkyl;
n represents an integer of from 1 to 6; and
X and R taken together form with the nitrogen a heterocyclic ring containing from 5 to 12 ring members.

2. Thermoplastic moulding compositions as claimed in claim 1 wherein the amines have a boiling point of at least 250° C.

3. Thermoplastically-processable moulding compositions of polyarylene sulphides containing from 0.1 to 5 parts, by weight, based on the content of polyarylene sulphide, of primary or secondary diamines having at least 6 carbon atoms, a boiling point of at least 150° C., and having the formula:

wherein
X represents an n-function
aliphatic $C_1$–$C_{30}$ hydrocarbon radical, in which at most every third chain member is an O-atom or an NH-group,
cycloaliphatic $C_5$–$C_{30}$ hydrocarbon radical,
araliphatic $C_7$–$C_{30}$ hydrocarbon radical,
R represents H, $C_1$–$C_{30}$ alkyl, $C_7$–$C_{30}$ aralkyl or $C_5$–$C_{30}$ cycloalkyl;
n is the integer 2; and
X and R taken together form with the nitrogen a heterocyclic ring containing from 5 to 12 ring members.

4. Thermoplastically-processable moulding compositions of polyarylene sulphides containing from 0.1 to 5 parts, by weight, based on the content of polyarylene sulphide, of primary or secondary amines having more than two amino groups, a boiling point of at least 150° C., and having the formula:

wherein
X represents an n-function
aliphatic $C_1$–$C_{30}$ hydrocarbon radical, in which at most every third chain member is an O-atom or an NH-group,
cycloaliphatic $C_5$–$C_{30}$ hydrocarbon radical,
araliphatic $C_7$–$C_{30}$ hydrocarbon radical,
R represents H, $C_1$–$C_{30}$ alkyl, $C_7$–$C_{30}$ aralkyl or $C_5$–$C_{30}$ cycloalkyl;
n is an integer from 3 to 6; and
X and R taken together form with the nitrogen a heterocyclic ring containing from 5 to 12 ring members.

5. Thermoplastically-processable moulding compositions of polyarylene sulphides containing from 0.1 to 5 parts, by weight, based on the content of polyarylene sulphide, of primary or secondary amines which are cycloaliphatic or N-heterocyclic amines, a boiling point of at least 150° C., and having the formula:

wherein
X represents an n-function
aliphatic $C_1$–$C_{30}$ hydrocarbon radical, in which at most every third chain member is an O-atom or an NH-group,
cycloaliphatic $C_5$–$C_{30}$ hydrocarbon radical,
araliphatic $C_7$14 $C_{30}$ hydrocarbon radical,
R represents H, $C_1$–$C_{30}$ alkyl, $C_7$–$C_{30}$ aralkyl or $C_5$–$C_{30}$ cycloalkyl;
n represents an integer of from 1 to 6; and
X and R taken together form with the nitrogen a heterocyclic ring containing from 5 to 12 ring members.

6. Thermoplastically-processable moulding compositions of polyarylene sulphides containing from 0.1 to 5 parts, by weight, based on the content of polyarylene sulphide, of imidazoline amidines, tetrahydropyrimidine amidines or mixtures thereof.

* * * * *